United States Patent [19]

Gürs

[11] Patent Number: 4,624,001

[45] Date of Patent: Nov. 18, 1986

[54] LASER APPARATUS

[75] Inventor: Karl Gürs, Eschborn, Fed. Rep. of Germany

[73] Assignee: Battelle-Institut e.V., Frankfurt am Main, Fed. Rep. of Germany

[21] Appl. No.: 560,377

[22] Filed: Dec. 12, 1983

[30] Foreign Application Priority Data

Dec. 11, 1982 [DE] Fed. Rep. of Germany ....... 3245959

[51] Int. Cl.$^4$ .............................................. H01S 3/09
[52] U.S. Cl. ...................................... 372/90; 372/58; 372/92
[58] Field of Search ............... 372/90, 92, 98; 372/55, 372/58, 59

[56] References Cited

U.S. PATENT DOCUMENTS

| 3,886,477 | 5/1975 | Ruby et al. | 372/90 |
| 3,886,481 | 5/1975 | Foster et al. | 372/90 |
| 3,984,784 | 10/1976 | Pinsley | 372/90 |
| 4,099,143 | 7/1978 | Foster | 372/58 |
| 4,287,487 | 9/1981 | Kuwabarc et al. | 372/58 |
| 4,320,358 | 3/1982 | Heidmann et al. | 372/90 |
| 4,344,174 | 8/1982 | Spalding et al. | 372/55 |
| 4,351,052 | 9/1982 | Sasaki et al. | 372/58 |

OTHER PUBLICATIONS

Low Voltage Gas Transport TE $CO_2$ Laser, H. J. Sequin and G. Sedgwick, Apr. 1972/vol. 11, No. 4/Applied Optics, pp. 745-748.

Primary Examiner—William L. Sikes
Assistant Examiner—Robert E. Wise
Attorney, Agent, or Firm—Fisher, Christen & Sabol

[57] ABSTRACT

In a laser system in accordance with the gas transport principle, at least one radial blower having diffusor and gas deflecting elements or baffles is provided for the gas circulation. At least two longitudinal tubes, which form together the laser resonator, are connected on one side directly with the inlet of the radial compressor or lead away from the diffusor. On the other side, the longitudinal tubes are connected via gas deflecting parts with at least one flow channel which directly leads away from the diffusor or opens into the inlet of the radial compressor, and which is designated as a cooling section. Thereby, at least one integrated closed loop is created for the laser gas without the use of gas conducting intermediate pipes.

10 Claims, 6 Drawing Figures

LASER APPARATUS

BACKGROUND OF THE INVENTION

1. Field Of The Invention

The invention relates to a laser apparatus in accordance with the gas transport principle with gas circulation, cooling and excitation system and a fast longitudinal gas flow.

2. Prior Art

The power, the amplification and efficiency of the molecular laser, in particular of $CO_2$ lasers, decrease with increasing temperatures in the laser gas. The reduction of the efficiency is due to the fact that with rising temperatures the line width becomes larger, the excitation energy is distributed among an increasing number of rotation lines, that the number of deactivating collisions increases and that the occupation of the laser end level increases by thermal excitation, which results in a decrease of inversion. (K. Gurs, "Laser 75 Opto-Electronics", Conference Proceedings, pp. 30 to 37.)

Therefore, methods have already been developed which carry off the heat together with the laser gas by the circulating and cooling of the gas. Suitable lasers consist of an active region in which the gas is excited, with an adjacent or integrated optical resonator, of a gas transport system with a built-in-cooler and a pump. Since large amounts of heat have to be carried off, large gas volumes have to be transferred by pumping. Corresponding known lasers are large and expensive, and their applications are limited because of their bulkiness.

This disadvantage is especially obvious in lasers with longitudinal flow where—as far as known systems are concerned—long gas lines are required. In addition, these pipes cause a correspondingly high flow resistance. Therefore, the efficiency of the system is reduced or especially large pumps will be necessary.

In systems with transversal flow, the interaction path of excited active molecules in the laser resonator is relatively small. Since the power density of lasers is not much above the saturation power, excitation energy is lost in this way, and the lasers have a comparatively low efficiency of for example less than about 10 percent. Furthermore, the transversal excitation is relatively non-homogeneous, resulting in unfavorable radiating characteristics.

The above-mentioned disadvantages of known gas transport and/or convection lasers have already been eliminated in systems where the laser chamber is designed as a cooled pipe which is arranged concentrically within one circulating turbine (German Patent Application, Publication No. 31 21 372). This actually represents an important progress compared with known gas transport lasers with longitudinal gas flows. However, a large technical effort is required in order to realize such laser.

Especially expensive, even in a large-scale manufacture, are the following four components:

The bearings. Because of the large diameter in the event of exterior bearings and the high rotating velocity, there exists a very high velocity of moving parts against fixed parts. The problem was solved by the use of gas bearings.

The drive. Being a fast running system (400 rotations/second) with hollow inner drive assembly, the engine represents an expensive special construction.

The blading. The circulating compressor is a special construction as well. It is especially unusual and difficult to manufacture the turbine blades fixed to a rotating exterior pipe. Even the use of radial compressors does not result in any important simplication because of the complicated gas transport.

The cooling system. This component is an expensive construction unit because of the circular symmetric configuration and the necessity of a high cooling power.

Known gas transportation lasers use pumps and blowers of different types, e.g., rotary vane pumps, roots blowers (K. Gurs, "Laser 75, Opto-Electronics", Conference Proceedings pp. 30 to 37, or H. Herbrich and B. Dellith, German Patent Application, Publication No. 29 25 829), reactive current ventilators (J. D. Foster, U.S. Pat. No. 4,099,143) or radial blowers (H. J. Seguin and G. Sedgwick, Appl. Optics 11, 1972, 745–748, or K. Sasaki et al., European Application 80 100 870.7, Publication No. 0 015 003). In all cases, the different components can be separately identified as partial systems with defined functions.

BROAD DESCRIPTION OF THE INVENTION

The object of the invention is to develop a laser system with a very compact configuration and a high efficiency with all functions being fully integrated so that very short gas paths without intermediate pipes can be realized.

The objects and the advantages of the invention are achieved by providing at least one radial compressor with diffuser and gas deflecting elements or metal sheets for the circulation of gas, and at least two longitudinal pipes which form together the laser resonator and which are connected on one side directly with the inlet of the radial compressor or lead away from the diffuser, and on the other side are connected via gas deflecting parts with at least one flow channel directly leading away from the diffuser or opening in the inlet of the radial compressor and being designed as a cooling section so that at least one integrated closed loop for the laser gas is formed.

Advantageously, in the laser apparatus of the invention, the axis of the radial compressor is arranged perpendicularly to the axis of two longitudinal pipes which together form a straight laser resonator, and the diffuser on both sides extends directly to two broad flow channels running parallel to the longitudinal pipes. Preferably at least four longitudinal pipes form two parallel laser pipes whose radiation paths are coupled with each other by means of deflecting mirrors. Preferably at least four longitudinal pipes form two laser pipes which are crossed and whose radiation paths are coupled with each other by means of deflecting mirrors. Also preferably several systems with a common axis are tandemly joined.

Advantageously, in the laser apparatus, the apparatus is designed in a rotational symmetry, the inlet of at least one radial compressor extends to a flow channel in the center, the diffuser extends towards the exterior in a cylindrical channel which is divided into several laser pipes, and the radiation path of the laser pipes is coupled by means of deflecting mirrors. Preferably the two systems with the same axis are homologously joined on the side opposite to the radial blower wheels so that the flow of the laser gas on both sides is directed away from the laser mirrors. Preferably the apparatus is composed of several separate units, vacuum tight connected, in a module configuration.

The invention does not only eliminate the already mentioned disadvantages of known gas transport laser devices. It provides, in addition, a gas transport laser apparatus as a particularly compact and efficient system with technically simple means. The laser apparatus according to the invention is small, has a high power output, a high efficiency and can be manufactured at a reasonable price.

The system in accordance with the invention fully integrates the different functions. The system can, furthermore, be realized in two different ways; the cooler can be installed on the compression side and the laser pipes on the suction side of the radial compressor, or vice versa.

BRIEF DESCRIPTION OF THE DRAWINGS

The invention is explained in detail by the enclosed drawings, wherein.

DETAILED DESCRIPTION OF THE INVENTION

Figure 1:
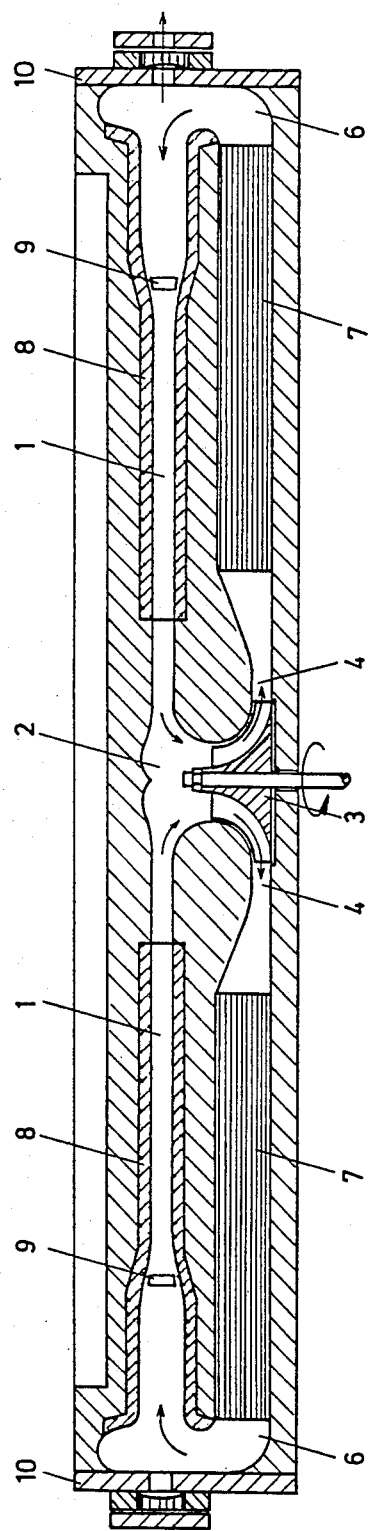
FIG. 1 shows in vertical section, an embodiment of the system in accordance with the invention.
Figure 2:
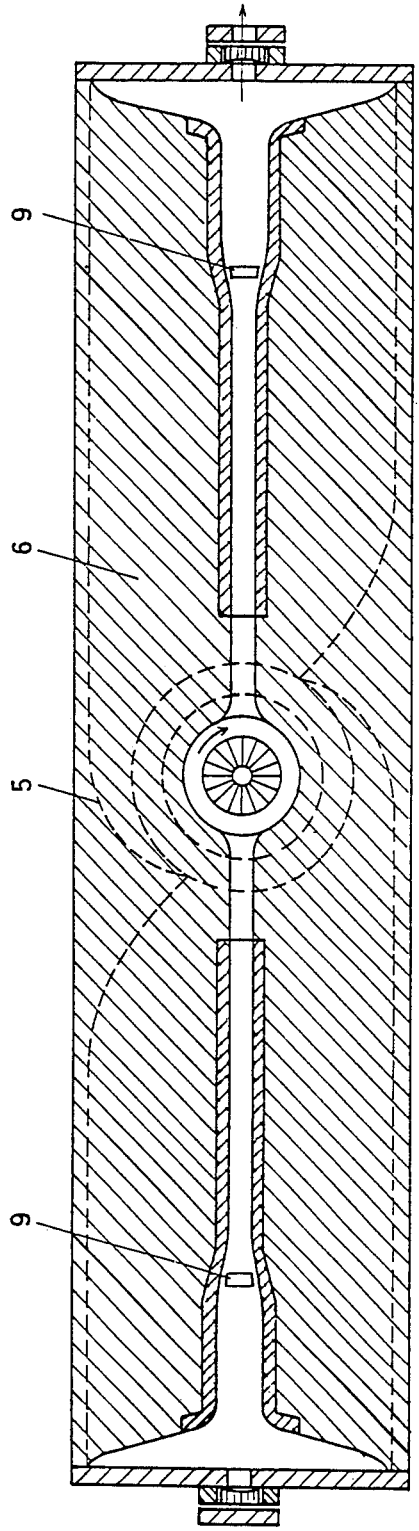
FIG. 2 shows the system shown in FIG. 1 in a horizontal section.

In the device shown in FIGS. 1 and 2, the laser gas is passed off with a high velocity in the center of longitudinal pipe 1, and flows directly without an intermediate pipe in inlet 2 having a neat pure aerodynamic form, of radial compressor 3. The axis of radial compressor 3 is arranged perpendicularly to the axis of the laser resonator formed of two longitudinal pipes 1.

From compressor 3 through diffuser 4 and via two spiral gas deflecting elements 5, the gas flows without a pipe connection directly into broad flow channel 6 which preferably includes heat exchanger (cooler) 7, and is deflected and/or returned on both sides to laser pipe 1.

The laser pipe itself is, as known, made of insulating material 8 such as glass, ceramics or plastic, and is inserted in longitudinal pipe 1. In a preferred embodiment, the laser pipe becomes wider at circular electrode 9. Circular electrode 9 preferably does not touch the wall so that a part of the laser gas can flow around the outer side of the ring directly into the other section of the laser pipe 1. An appropriate distance between electrodes 9 and terminal plate 10 of the laser insures that the gas discharge does not penetrate against the direction of the flow towards plates 10 of the laser system.

In another embodiment, the two outer parts of the entire system between plates 10 and a level which runs vertically through electrodes 9, are made of insulating material. The front plates are insulated, and a gas discharge between electrodes 9 and front plates 10 is impossible. If cooler 7 is shortened, the distance of electrode 9 to front plates 10 will be smaller so that laser pipe 1 can be exploited to a higher extent. Of course, not only is cooler 7 cooled with water, but also the other parts which are heated by the laser gas are cooled with water or another cooling agent.

Flow velocities of more than 240 m/s are achieved in a laser pipe of 4.5 cm diameter and 1.50 m length and with a compressor of an impeller diameter of about 20 cm; the power is approx. 1 kW.

Figure 3:
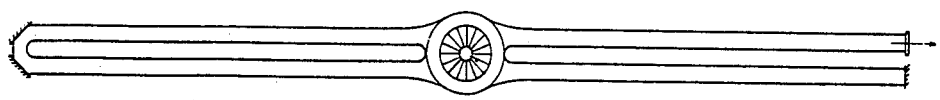
FIGS. 3 and 4 show schematically a combination of several systems in accordance with FIGS. 1 and 2 with parallel and crossed installation, respectively, of the longitudinal pipes and/or laser pipes.
Figure 4:
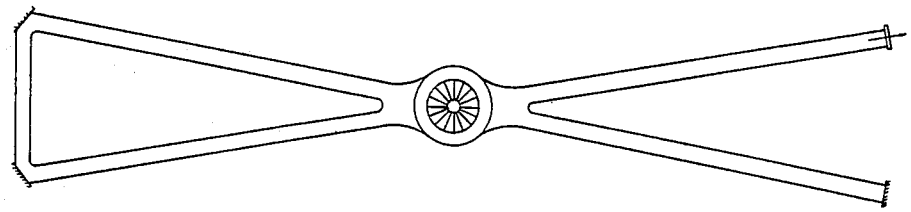

It is, however, easy to achieve even higher outputs with this system. With a larger compressor and a larger pipe diameter, an output of more than 3 kW can be reached. It is more appropriate, however, with regard to a good beam quality, to use two smaller laser pipes in a parallel or crossed design, as shown in FIGS. 3 and 4, instead of using a pipe with a correspondingly larger diameter. In both cases, the two pipes are optically connected by two deflecting mirrors (not shown in drawings).

Figure 5:
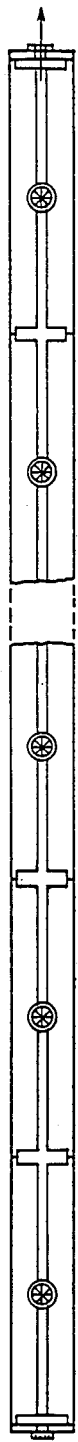
FIG. 5 shows another embodiment wherein several systems in accordance with FIGS. 1 and 2 are tandem joined.

Of course, it will be possible to couple several systems of the invention with each other, side by side in a parallel manner, above each other, or one after another. In the event of a tandem joining, as shown in FIG. 5, the intermediate mirrors for the coupling of the systems will not be required.

When using double-suction turbines, two systems in a mirror-inverted arrangement can be joined at the bottom side of cooler 7 and without a separating wall.

The invention can also be realized in a way that the cooler is arranged on the suction side and the laser pipes on the compression side. In this event, the laser gas flows, after having passed the cooler without an intermediate pipe, directly in the streamlined inlet of the radial compressor, and flows, when leaving the compressor and flowing through the spirals (guiding screens), directly into a flow channel formed as a laser pipe or a parallel arranged laser pipes, and is then at the ends of this flow channel deflected and flows again back to the cooler.

A particular favourable version with a high laser efficiency is a rotationally symmetric embodiment, wherein the center of rotation of the impeller and the axis of the laser pipes are arranged in a parallel way to each other.

Figure 6:
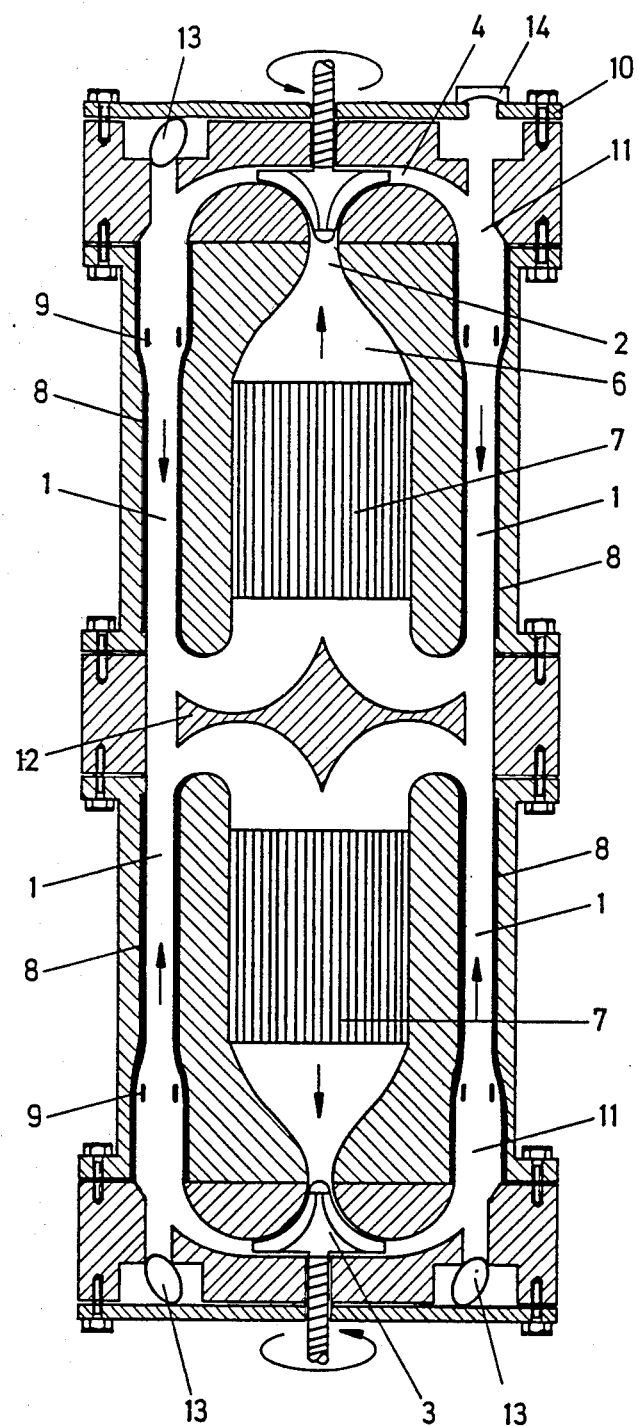
FIG. 6 shows another embodiment with two systems joined on the side of the gas deflecting elements.

Also in this version, as shown in FIG. 6, the laser gas leaves cooler 7 which is arranged along the axis of the system, flows through diffuser 4 and, if required, a spiral in the form of gas baffles into annular channel 11 which is divided into laser pipes 1. It is understood that laser pipes 1 do not have to fill the entire section of the annular area. The gas may be passed through a limited number, e.g., six, of symmetrically designed laser pipes 1. After having passed laser pipes 1, the gas is returned via element (shaped part) 12 to cooler 7 again. The laser output is deflected from one pipe to the next by properly inclined mirrors 13 so that a laser oscillation can be established between end mirrors 14. One end mirror is, in a known way, a partially transmitting mirror; the laser emission can emerge through this mirror.

Another doubling of the efficiency is achieved when two such systems are connected with the same axis, however, in mirror-inverted arrangement on the side of the deflection parts or on the side of the impeller. A contamination of mirrors is avoided by chosing the flow in a way that the movement of the gas, as shown in FIG. 6, leads away from the mirrors on both sides.

It is, of course, possible to construct the entire system in a modul configuration. By installing an intermediate part made of insulating material, by a partial insulation of the deflecting part and the additional use of one high tension electrode each in the middle of the system, it is also possible to put electrodes 9 on earth potential and to arrange them at the beginning of the laser pipes so that the laser pipes in their entire length can be used as active areas. In order to improve the gas discharge (ignition and homogeneousness), intermediate electrodes may also be provided.

What is claimed is:

1. Laser apparatus in accordance with gas transport principle with gas circulation, cooling and excitation system and fast longitudinal gas flow, comprised of at least one radial compressor with a diffuser and at least two longitudinal tubes which together form the laser resonator, the axis of one of the radial compressors being arranged perpendicularly to the axis of said two longitudinal pipes, which form together a straight line resonator, the tubes on one side directly open into the inlet of the radial compressor and on the other side are connected via gas deflecting elements with at least one flow channel into which cooling elements are integrated, the flow channels being connected via the diffuser with the outlet of the radial compressor, so that at least one integrated closed loop for the laser gas is formed, the diffuser on both sides of the compressor extending directly to two broad flow channels extending parallel to the longitudinal tubes.

2. Laser apparatus as claimed in claim 1 wherein at least four longitudinal tubes form two parallel laser tubes whose radiation paths are coupled with each other by means of deflecting mirrors.

3. Laser apparatus as claimed in claim 1 wherein at least four longitudinal tubes form two laser tubes which are crossed and whose radiation paths are coupled with each other by means of deflecting mirrors.

4. Laser apparatus as claimed in claim 1 wherein several systems with a common axis are tandem joined.

5. Laser apparatus as claimed in claim 1 wherein the apparatus is composed of several separate units, vacuum tight connected, in a module configuration.

6. Laser apparatus as claimed in claim 5 wherein the interior unit consists of at least two pieces of longitudinal tubes, the inlet of the radial compressor, the diffuser with the radial compressor and the deflecting elements to which are attached on both sides, one unit each with pieces of longitudinal tubes and flow channels, and another unit each with a gas deflecting element and end plate with laser mirror.

7. Laser apparatus as claimed in claim 5 wherein the interior unit consists of gas deflecting elements to which are attached on both sides, one unit each with a concentrically installed, cylindrical channel which is divided into laser tubes, and a central flow channel, and another unit comprising the inlet of the radial compressor, the diffuser, with the radial compressor, gas deflecting elements and the end plate with the laser mirror.

8. Laser apparatus with reversed gas flow direction, in accordance with the gas transport principle with gas circulation, cooling and excitation system and fast longitudinal gas flow, comprised of at least one radial compressor with a diffusor and at least two longitudinal tubes which together form the laser resonator, the tubes on one side directly open into the inlet of the radial compressor and on the other side are connected via gas deflecting elements with at least one flow channel into which cooling elements are integrated, the flow channels directly being connected via the diffusor with the outlet of the radial compressor, so that at least one integrated closed loop for the laser gas is formed, the longitudinal tubes leading away from the diffusor which forms the radial compressor outlet and being connected via gas deflecting elements with at least one flow channel comprising cooling elements directly leading to the inlet of the radial compressor so that at least one integrated closed loop for the laser gas is formed, the compressor axis being parallel to the laser tubes, the inlet of one radial compressor extending to a flow channel in the center with integrated cooling elements, and the diffusor extending towards the exterior in a cylindrical channel which is divided into several parallel laser tubes, and wherein the laser radiation is deflected from one tube to the other by mirrors arranged at the end of the tubes with an inclination of 45 degrees.

9. Laser apparatus as claimed in claim 8 wherein two systems with the same axis are homologously joined on the side of the gas deflecting elements so that the flow of the laser gas on both sides is directed away from the laser mirrors.

10. Laser apparatus as claimed in claim 4 wherein two systems with the same axis are homologously joined on the side of the radial compressor.

* * * * *